(12) United States Patent
Tanabe et al.

(10) Patent No.: US 7,519,127 B2
(45) Date of Patent: Apr. 14, 2009

(54) WIRELESS TRANSMISSION DEVICE AND WIRELESS RECEIVING DEVICE

(75) Inventors: Yasuhiko Tanabe, Kawasaki (JP); Daisuke Takeda, Kawasaki (JP); Tsuguhide Aoki, Kawasaki (JP); Kohsuke Harada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 601 days.

(21) Appl. No.: 11/187,853

(22) Filed: Jul. 25, 2005

(65) Prior Publication Data
US 2006/0023667 A1 Feb. 2, 2006

(30) Foreign Application Priority Data
Jul. 27, 2004 (JP) .............................. 2004-219197

(51) Int. Cl.
*H04B 7/02* (2006.01)
(52) U.S. Cl. ....................... 375/267; 375/347; 370/334
(58) Field of Classification Search ................... 455/92; 370/334, 335
See application file for complete search history.

(56) References Cited
U.S. PATENT DOCUMENTS
2003/0003880 A1* 1/2003 Ling et al. .................... 455/92

2004/0146025 A1* 7/2004 Hwang et al. ............... 370/334
2004/0218570 A1* 11/2004 Black et al. ................. 370/335
2004/0233838 A1 11/2004 Sudo et al.

OTHER PUBLICATIONS

Arogyaswami Paulraj, et al., "Introduction to Space-Time Wireless Communications", Cambridge University Press, Cambridge, UK, 2003, 7 pages.

\* cited by examiner

*Primary Examiner*—David C Payne
*Assistant Examiner*—Leon Flores
(74) *Attorney, Agent, or Firm*—Oblon, Spivak, McClelland, Maier & Neustadt, P.C.

(57) ABSTRACT

A wireless transmission device which communicates with a wireless reception device is provided with a transmission-signal-generating unit configured to generate, transmission signals having transmission rates arranged in order corresponding to an input order of data items of the information sequence. The transmission device is also provided with a preamble adder which adds, to the transmission signals, respective preamble signals assigned in order of the transmission rates and used for estimation of channel responses at the wireless reception device. The transmission device is further provided with transmission units configured to transmit the transmission signals with the preamble signals added thereto.

13 Claims, 8 Drawing Sheets

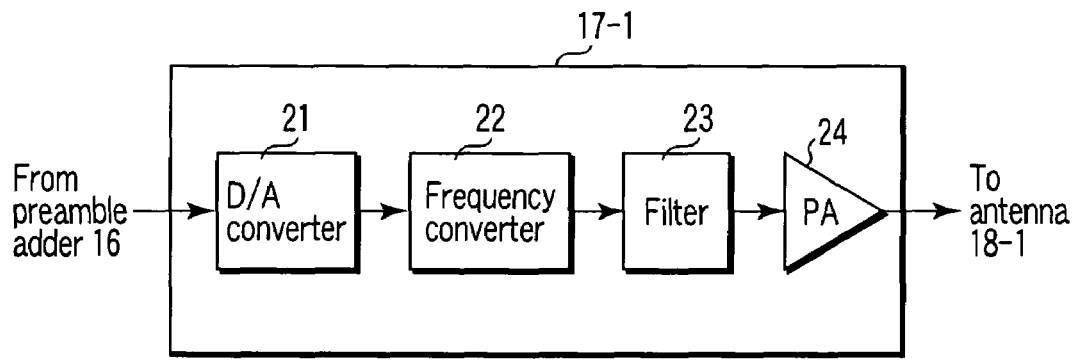
F I G. 2
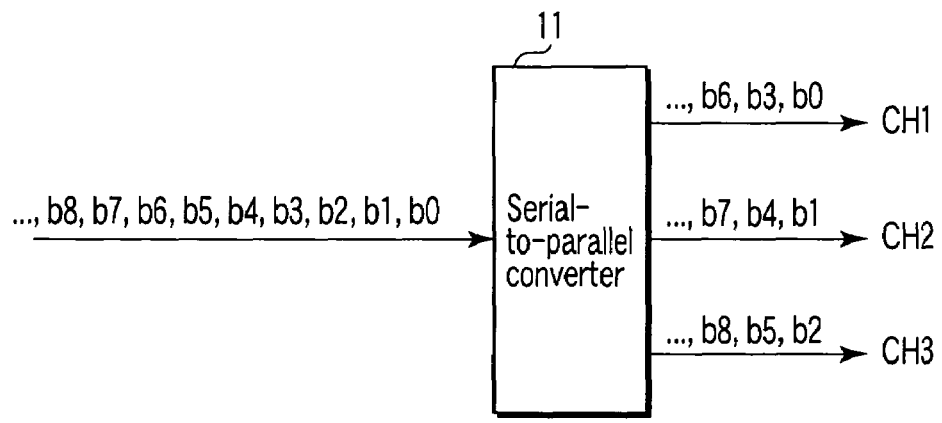
F I G. 3
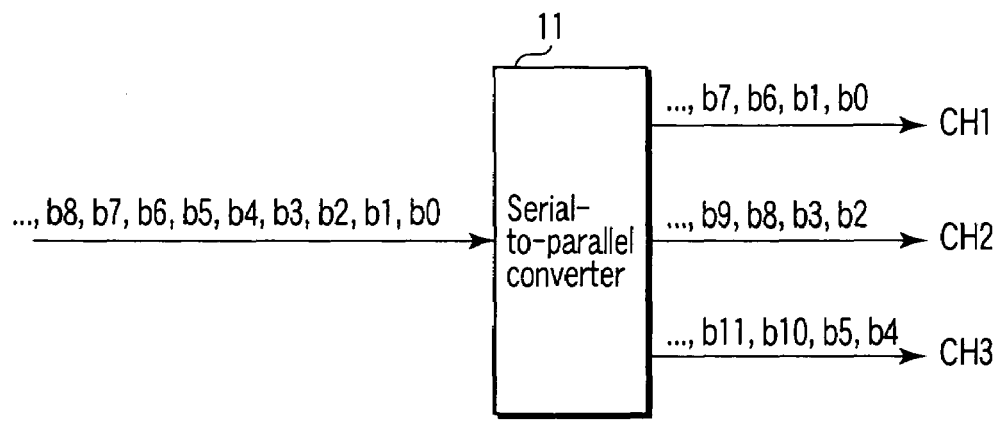
F I G. 4

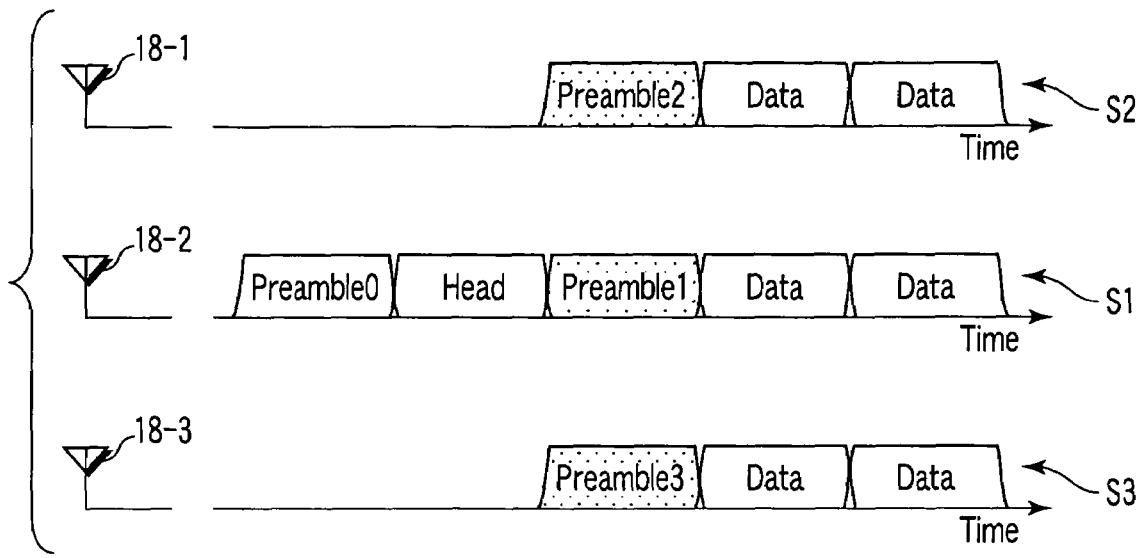
FIG. 7
| Number of transmission antenna | Combination of transmission rates | Data length |
FIG. 8
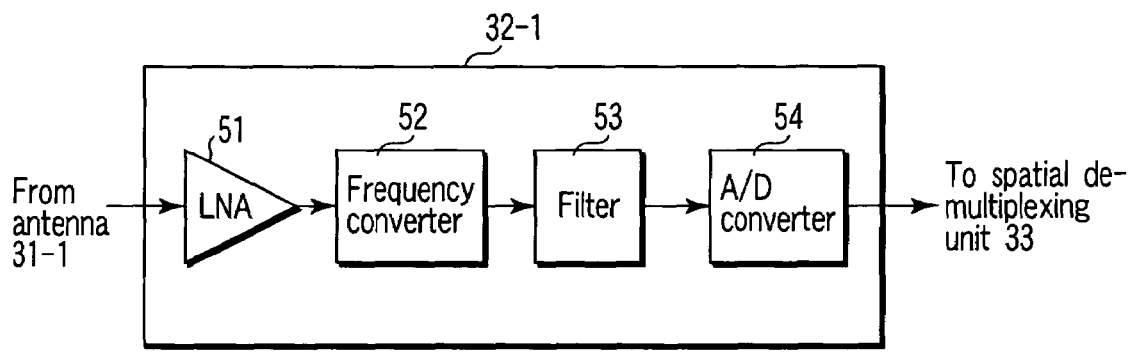
FIG. 10

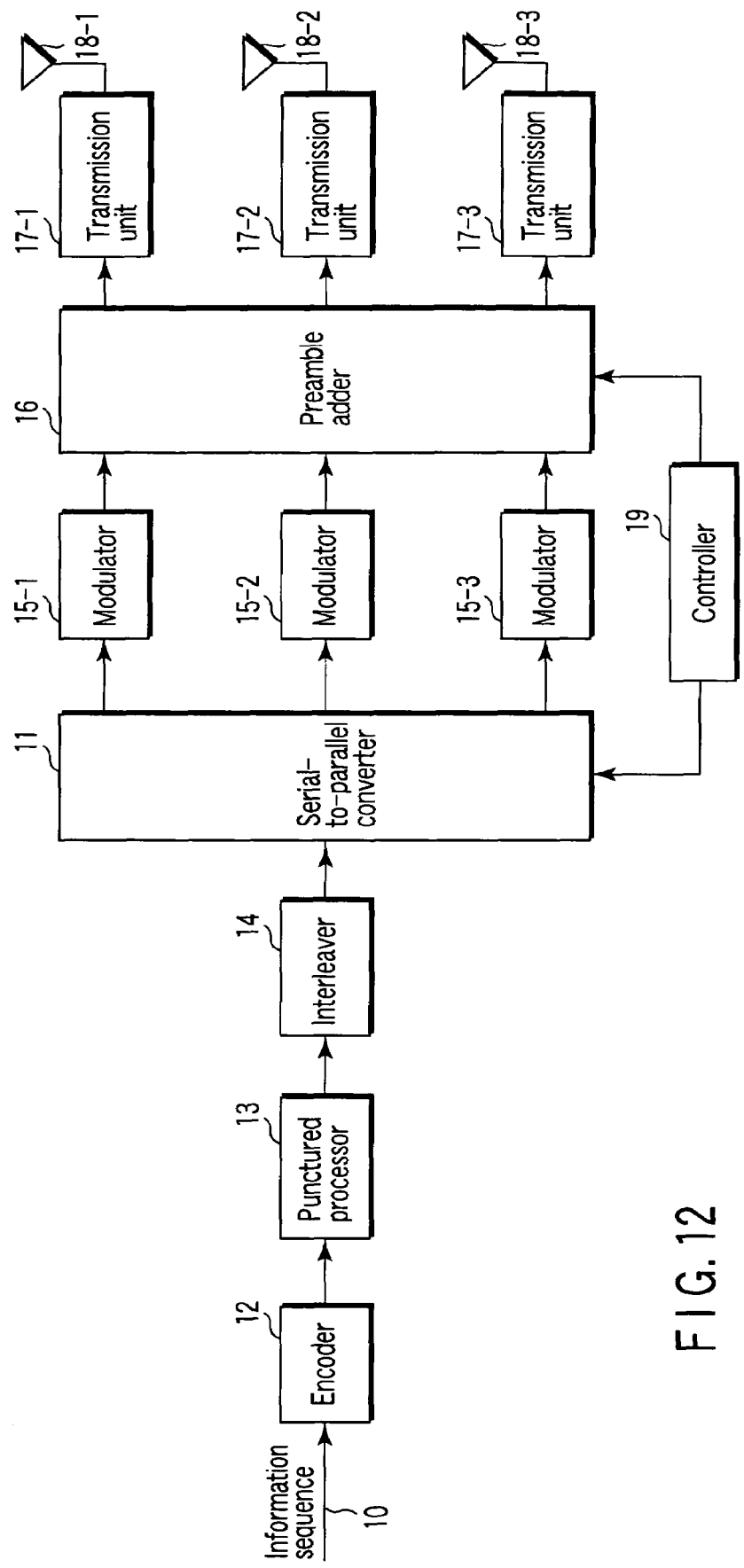
F I G. 12

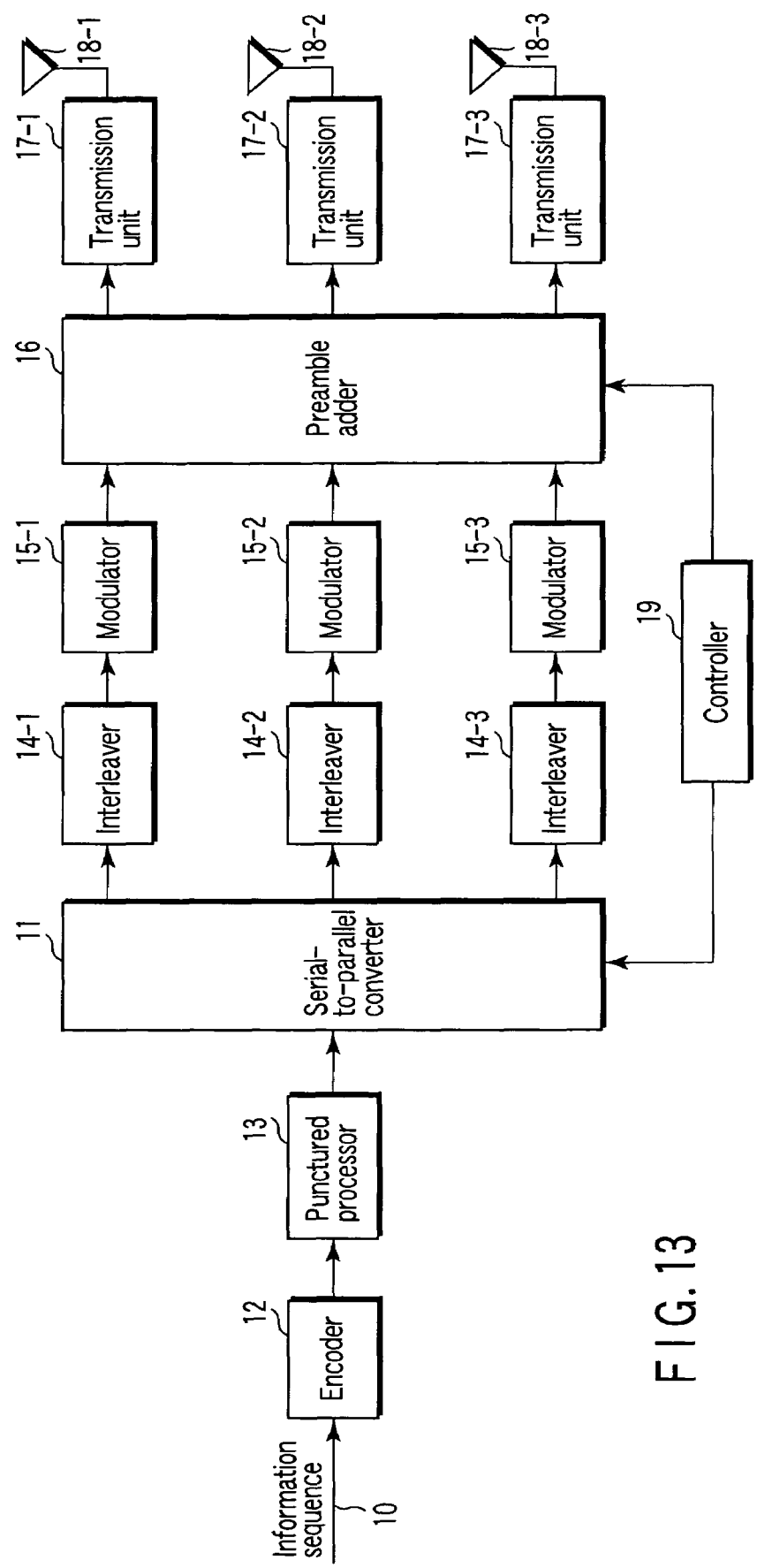
F I G. 13

WIRELESS TRANSMISSION DEVICE AND WIRELESS RECEIVING DEVICE

CROSS-REFERENCE TO RELATED APPLICATIONS

This application is based upon and claims the benefit of priority from prior Japanese Patent Application No. 2004-219197, filed Jul. 27, 2004, the entire contents of which are incorporated herein by reference.

BACKGROUND OF THE INVENTION

1. Field of the Invention

The present invention relates to a wireless transmission device for transmitting signals in parallel, using a plurality of transmission units, and a wireless receiving device for receiving the signals transmitted.

2. Description of the Related Art

A scheme for transmitting a plurality of signals in parallel using a plurality of transmission units each having a transmitter and antenna is known as a technique for increasing the rate of wireless communication from, for example, A. Paulraj, R. Nabar and D. Gore, Introduction to Space-Time Wireless Communication, Cambridge University Press, Cambridge, UK, 2003. In this scheme, to-be-transmitted information is divided into a plurality of information units by serial-to-parallel conversion, each information unit is subjected to, for example, encoding and modulation, thereby generating a plurality of transmission signals and distributing the transmission signals to the respective transmission units. Each transmission unit performs digital-to-analog (D/A) conversion and/or frequency conversion on the received transmission signal, thereby generating a radio frequency (RF) signal and transmitting it through the corresponding transmission antenna after amplifying it.

The signals transmitted in parallel from the transmission units are subjected to multiplexing on propagation paths in space, therefore, the receiving side must take measures against mutual interferences. In order to avoid the interferences, a plurality of receiving units that have respective antennas and receivers may be used to separate the transmitted signals. Even a single receiving unit can simultaneously detect a plurality of signals without mutual interferences by estimating, from the received signals, the signals whose joint probability density function is maximum.

In the above-described wireless communication system, the transmission rate can be enhanced in accordance with the number of transmission units, without extending the frequency bandwidth for communication. Accordingly, compared to the case of using a single transmission unit, the frequency efficiency is increased, and the throughput is enhanced.

Since the antennas included in the respective transmission units are located at different positions, the signals received at the receiving side, which correspond to the respective transmission signals, have different power levels. Accordingly, the each channel has different capacity. In light of this, to enhance the efficiency of transmission, the signal transmission rate, more specifically, the modulation and coding scheme (MCS), is optimized.

In particular, in the so-called multi-input multi-output (MIMO) system, in which signals are transmitted, utilizing spatial multiplexing, from a wireless transmission device with a plurality of transmission units, and received by a wireless receiving device with a plurality of receiving units, a number of propagation paths, i.e., channels, which have different channel responses, are formed between the transmission and receiving devices. Therefore, if the transmission rate is changed appropriately, highly efficient transmission can be realized.

In this case, however, it is necessary to notice, to the receiving side, the transmission rate of a signal transmitted from each transmission unit, i.e., the MCS of each transmitted signal. Specifically, it is necessary to include, in the header of each transmission signal, information indicating the MCS of signals transmitted from each transmission unit. If a large number of MCS sets are used, the data length of the header is inevitably increased, thereby reducing the throughput.

BRIEF SUMMARY OF THE INVENTION

It is an object of the invention to provide a wireless transmission device wherein the amount of information can be effectively reduced, which indicates the transmission rates of signals transmitted from a plurality of transmission units to the receiving side, and, more specifically, which indicates, for example, the MCS of each transmitted signal. It is another object to provide a wireless receiving device for receiving signals transmitted from the wireless transmission device.

In accordance with a first aspect of the invention, there is provided a wireless transmission device comprises a transmission-signal-generating unit configured to generate a plurality of transmission signals having transmission rates arranged in order corresponding to an input order of an information sequence; a preamble adder which adds, to the plurality of transmission signals, respective preamble signals assigned in order of the transmission rates and used for estimation of channel responses; and a plurality of transmission units configured to transmit the transmission signals with the preamble signals added thereto, the plurality of transmission units including respective transmission antennas.

Preferably, in the wireless transmission device, at least one of the plurality of transmission signals includes information indicating a combination of the transmission rates of the plurality of transmission signals.

In accordance with a second aspect of the invention, there is provided a wireless receiving device comprises a receiving unit including a plurality of receiving antennas and configured to receive a plurality of transmission signals via a plurality of channels, thereby acquiring a plurality of reception signals, the plurality of transmission signals having transmission rates arranged in order corresponding to an input order of an information sequence, the plurality of transmission signals being provided with respective preamble signals assigned in order of the transmission rates and used for estimation of channel responses; a channel response estimation unit configured to estimate a plurality of channel responses using the preamble signals contained in the received signals; a spatial demultiplexing unit configured to separate, from the received signals, signals corresponding to the transmission signals, using estimation results of the channel response estimation unit; and a reproduction unit configured to reproduce the information sequence using the preamble signals contained in the signals separated from the reception signals.

BRIEF DESCRIPTION OF THE SEVERAL VIEWS OF THE DRAWING

FIG. 2 is a block diagram illustrating a transmission unit appearing in FIG. 1;

FIG. 3 is a view useful in explaining an operation example of the serial-to-parallel converter appearing in FIG. 1;

FIG. 4 is a view useful in explaining another operation example of the serial-to-parallel converter appearing in FIG. 1;

FIG. 7 is a view illustrating yet another frame format example;

FIG. 8 is a view illustrating a content example of the header signal appearing in FIGS. 5 to 7;

FIG. 10 is a block diagram illustrating a receiver appearing in FIG. 9;

FIG. 12 is a block diagram illustrating a wireless transmission device according to yet another embodiment of the invention; and FIG. 13 is a block diagram illustrating a wireless transmission device according to a further embodiment of the invention.

DETAILED DESCRIPTION OF THE INVENTION

Figure 1:
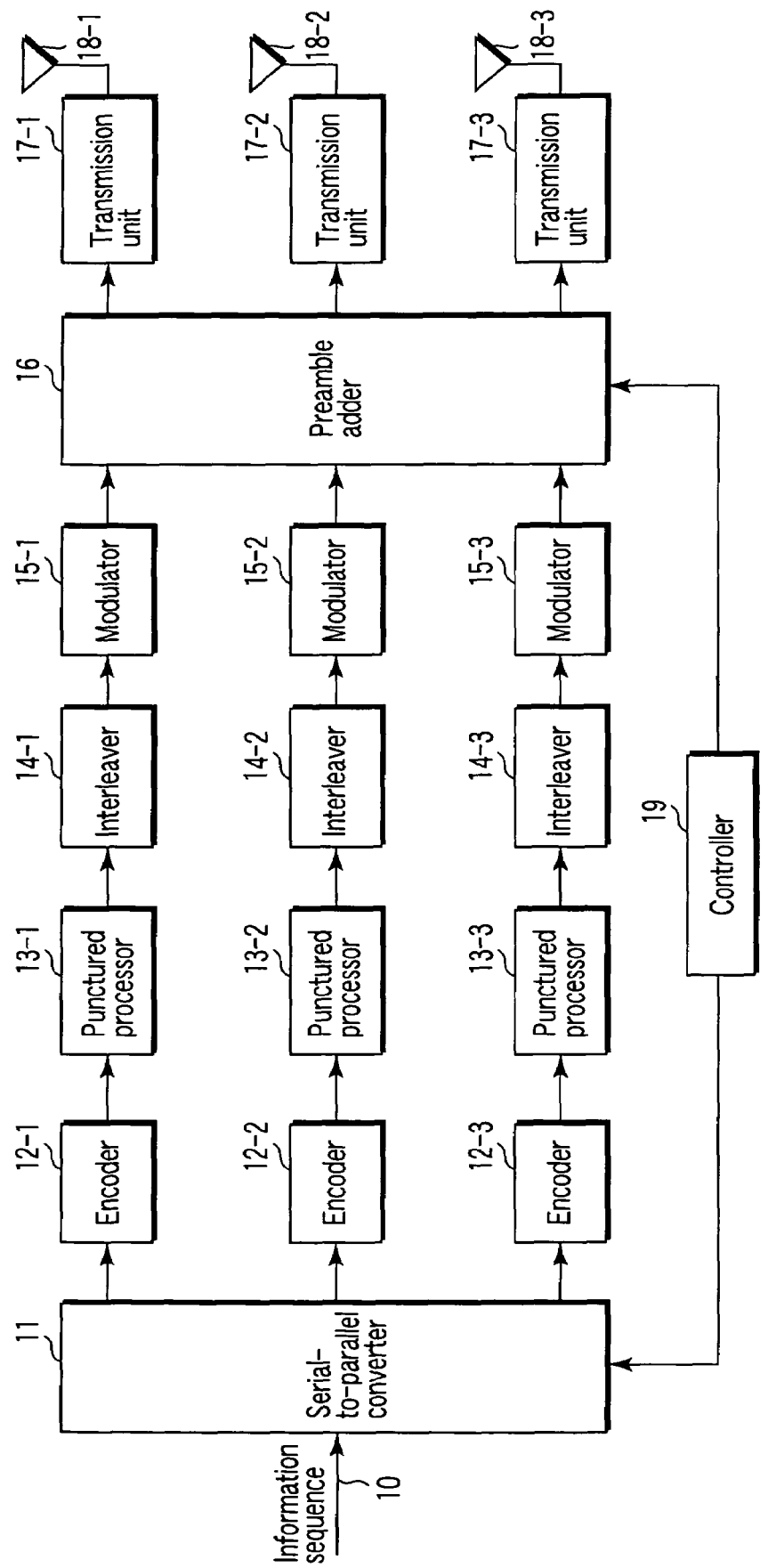
FIG. 1 is a block diagram illustrating a wireless transmission device according to an embodiment of the invention.

As shown in FIG. 1, in a wireless transmission device according to an embodiment, a to-be-transmitted information sequence 10 is input to a serial-to-parallel converter 11. As described later, the information sequence 10 includes a preamble signal and header signal, as well as a data signal. The information sequence 10 is divided into information units of a predetermined length by the serial-to-parallel converter 11, and the information units are output in parallel. Each information unit output from the serial-to-parallel converter 11 is input to one of encoders 12-1 to 12-3 under the control of a controller 19, where it is encoded with a certain coding rate corresponding to the one encoder. The encoders 12-1 to 12-3 may employ any coding scheme. Typically, a scheme for outputting a convolutional code or Read-Solomon code as coded data is used. Further, the coding rates of the encoders 12-1 to 12-3 may be variable or fixed.

Coded data items output from the encoders 12-1 to 12-3 are input, in this embodiment, to punctured processors 13-1 to 13-3, where they are subjected to a punctured process for changing their coding rates. Specifically, if the coding rate of each of the coded data items output from the encoders 12-1 to 12-3 is a first coding rate, the coding rate of each coded data item acquired after the punctured process by the punctured processors 13-1 to 13-3 is a second coding rate that is higher than or equal to the first coding rate. The coded data items having their coding rates changed by the punctured process are input to interleavers 14-1 to 14-3, where they are subjected to an interleave process.

The coded data items acquired after the interleave process by interleavers 14-1 to 14-3 are input to modulators 15-1 to 15-3, where they are modulated into respective transmission signals using a certain modulation scheme (or using respective modulation schemes). The thus-generated transmission signals are input to a preamble adder 16, where a preamble signal as a known signal for channel response estimation is added to the transmission signals under the control of the controller 19. The preamble signal may be formed of any type of sequence. It suffices if the wireless receiving device can estimate, the channel response of a signal transmitted from each transmission unit of the wireless transmission device.

The transmission signals, to which the preamble signal is added, are input to the transmission units having respective transmission unit 17-1 to 17-3 and antennas 18-1 to 18-3, and are transmitted by radio from the transmission units.

As can be seen from FIG. 2 that shows only the transmission unit 17-1 as a representative, in each of the transmission units 17-1 to 17-3, a digital transmission signal from the preamble adder 16 is converted into an analog signal by a digital-to-analog (D/A) converter 21. The resultant signal is sent to a frequency converter 22, where it is converted into an RF signal through frequency conversion, i.e., "up" conversion. The RF signal output from the frequency converter 22 has its undesired component removed by a filter 23, and has its amplitude amplified by a power amplifier (PA) 24. The resultant signal is sent to the transmission antenna (18-1 to 18-3).

In the wireless transmission device of FIG. 1, the encoders 12-1 to 12-3, punctured processors 13-1 to 13-3, interleavers 14-1 to 14-3 and modulators 15-1 to 15-3 provide a transmission-signal-generating unit having a plurality of channels (in this embodiment, three channels). Here, one channel is formed with a path from the encoder to the antenna. The signal transmitted by each channel is called as a stream or a sub stream. The information units, which are acquired by dividing the information sequence 10 using the serial-to-parallel converter 11, are distributed to the respective transmission-signal-generating unit. The transmission rate of the each transmission-signal-generating unit is determined from the coding rate set by each combination of the encoders 12-1 to 12-3 and punctured processors 13-1 to 13-3, and the modulation scheme of each of the modulators 15-1 to 15-3.

The information units from the serial-to-parallel converter 11 are distributed to the respective channels of the transmission-signal-generating unit in the order corresponding to the transmission rates of the channels. In other words, the transmission-signal-generating unit generates a plurality of transmission signals that correspond to the information units from the serial-to-parallel converter 11 and have transmission rates arranged in the order corresponding to the input order of the data items of the information sequence 10.

FIGS. 3 and 4 show how the information units output from the serial-to-parallel converter 11 are distributed to the encoders for channels CH1, CH2 and CH3 of the transmission-signal-generating unit. Assume here that the channel CH1 has the highest transmission rate, the channel CH2 has the second highest transmission rate, and the channel CH3 has the lowest transmission rate. The information sequence 10 is a bit sequence of b0, b1, b2, b3, b4, b5, b6, b7, which are input in this order.

In the example of FIG. 3, the information sequence 10 is distributed in units of bits to each of the channels CH1, CH2 and CH3. Namely, a bit sequence of b0, b3, b6, . . . are distributed to the channel CH1, b1, b4, b7, . . . to the channel CH2, and b2, b5, b8, . . . to the channel CH3. In the example of FIG. 4, the information sequence 10 is distributed in units of continuous two bits to each of the channels CH1, CH2 and CH3. Namely, b0, b1, b6, b7, . . . are distributed to the channel CH1, b2, b3, b8, b9, . . . to the channel CH2, and b4, b5, b10, b11 . . . to the channel CH3. Thus, the serial-to-parallel converter 11 divides the information sequence 10 into information units of a bit length not less than one bit, and the information units are distributed, in the order of input, to the channels CH1, CH2 and CH3 of the transmission-signal-generating unit.

In the embodiment, the information units of the information sequence 10 are sequentially distributed to the channels arranged in the order of descending transmission rate. Alternatively, they may be sequentially distributed to the channels arranged in the order of ascending transmission rate. In short, it is sufficient if the transmission rates are made to correspond to the distribution order of the information units. Further, it is apparent that each information unit is not always formed of one or two bits, but may be formed of three or more bits. Such control of the serial-to-parallel converter 11 is performed by the controller 19.

The embodiment assumes, as one system to which the embodiment is applicable, a MIMO system, i.e., a wireless communication system in which communication is performed between a wireless transmission device having a plurality of transmission units and a wireless receiving device having a plurality of receiving units. In MIMO systems, since a number of spatial channels having different channel responses are formed between the wireless transmission device and wireless receiving device, communication of a high transmission efficiency can be realized by changing the transmission rate of a signal in accordance with the channel response of each channel.

To appropriately control the transmission rate of a signal transmitted from each transmission unit of the wireless transmission device, it is necessary for the wireless transmission device to grasp the states of channels to some extent. A method for feeding back channel response information from the wireless receiving device to the transmission device is exemplified as a method for enabling the wireless transmission device to acquire the states of channels. As the feedback method, a method for directly transmitting channel response information, and a method for transmitting relative information, such as the intensity of signal power measured by the wireless receiving device, are possible. A scheme is also possible, in which the wireless transmission device transmits, to the wireless receiving device, a request to notice a transmission rate the receiving device desires. Thus, by requesting the wireless receiving device to return information indicating the states of channels or the transmission rate itself, the wireless transmission device can determine the transmission rate.

Moreover, in general, the wireless transmission and receiving device alternately transmit signals, i.e., the receiving device may well transmit a signal to the transmission device. In light of this, a method for determining the channel response based on a signal transmitted from the receiving device to the transmission device is also possible. In this case, the transmission device can determine an appropriate transmission rate for transmission based on, for example, the power of a received signal. How to determine the transmission rate of a signal transmitted from each transmission unit of the transmission device is not limited to the above-mentioned methods, and any other appropriate methods may be used.

In the wireless transmission device of this embodiment, to enable the transmission-signal-generating unit to realize a plurality of transmission rates, the modulators 15-1 to 15-3 are designed to be able to perform modulation using a plurality of modulation schemes. For example, they perform modulation using one selected from modulation schemes of different modulation level. The modulation schemes include phase modulation schemes, such as binary phase shift keying (BPSK), quadrature phase shift keying (QPSK) and 8 phase shift keying (8 PSK), and quadrature amplitude modulation schemes, such as 16 quadrature amplitude modulation (16 QAM) and 64 quadrature amplitude modulation (64 QAM). However, the modulation schemes the modulators 15-1 to 15-3 can utilize are not limited to the above. Other schemes, such as 128 QAM and 256 QAM, may also be utilized. Further, it is not always necessary to install all of the above-mentioned schemes in each modulator 15-1 to 15-3. It is sufficient if each modulator 15-1 to 15-3 employs at least two modulation schemes for realizing at least two transmission rates. Moreover, the modulators 15-1 to 15-3 do not always perform modulation using completely different modulation schemes, but two or more modulators can employ the same modulation scheme.

The preamble adder 16 adds a preamble to each of the three channels generated by the transmission-signal-generating unit that includes the encoders 12-1 to 12-3, punctured processors 13-1 to 13-3, interleavers 14-1 to 14-3 and modulators 15-1 to 15-3, the preamble enabling the wireless receiving device to estimate the response of each of the three channels. In the embodiment, preambles for channel response estimation, which are arranged in order in accordance with transmission rate, are added to a plurality of transmission signals having their transmission rates arranged in order in accordance with the order of input of corresponding data items included in the information sequence 10. Namely, the preamble signals are added which are arranged in the same order as that in which the information units from the serial-to-parallel converter 11 are distributed to the respective channels, i.e., in the same order as that of the transmission rates of the channels.

Figure 5:
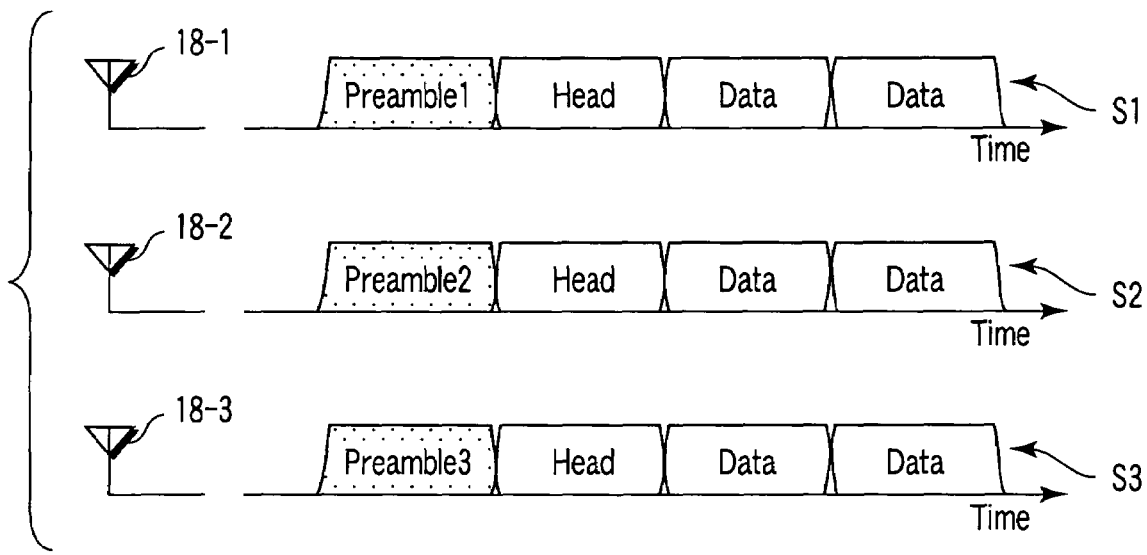
FIG. 5 is a view illustrating a frame format example.
Figure 6:
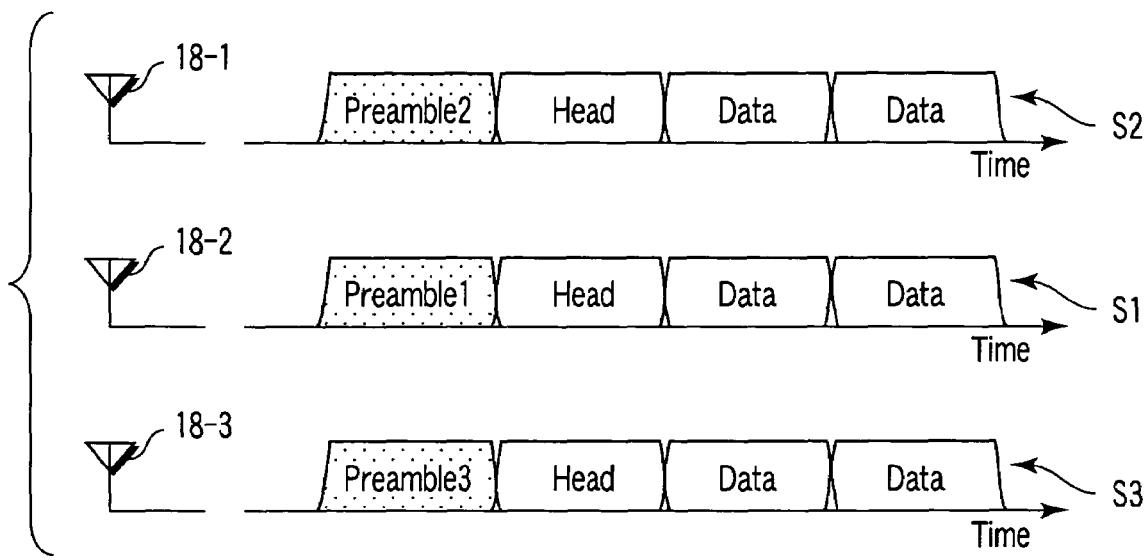
FIG. 6 is a view illustrating another frame format example.

Referring now to FIGS. 5 to 7, a description will be given of a procedure example for adding the preamble signals. FIGS. 5 to 7 show arrangement examples of the preamble signals, header signals and Data signals, which are imparted as the information sequence 10. Assume here that the preamble signals added by the preamble adder 16 are "Preamble 1", "Preamble 2" and "Preamble 3", and the preamble signals are arranged in the priority order of "Preamble 1", "Preamble 2" and "Preamble 3".

In FIGS. 5 to 7, S1 to S3 denote the respective transmission signals, corresponding to the three channels, generated by the transmission-signal-generating unit, and it is assumed that the transmission rate of the transmission signal S1 is the highest, that of the transmission signal S2 is the second highest, and that of the transmission signal S3 is lowest. Further, as shown in FIG. 3 or 4, the information units from the serial-to-parallel converter 11 are distributed to the respective channels of the transmission-signal-generating unit in the decreasing order of transmission rate. In other words, it is assumed that the transmission signals S1 to S3 are arranged in the descending order of transmission rate.

In the case of FIG. 5, in the preamble adder 16, under the control of the controller 19, the preamble signal "Preamble 1" of the highest priority is added to the transmission signal S1 of the highest transmission rate to be transmitted from the transmission antenna 18-1. Similarly, the preamble signal "Preamble 2" of the second highest priority is added to the transmission signal S2 of the second highest transmission rate to be transmitted from the transmission antenna 18-2. Further, the preamble signal "Preamble 3" of the lowest priority is added to the transmission signal S3 of the lowest transmission rate to be transmitted from the transmission antenna 18-3.

On the other hand, as shown in FIG. 6, when the transmission signal S1 of the highest transmission rate is transmitted from the transmission antenna 18-2, the preamble signal "Preamble 1" of the highest priority is added to the signal transmitted from the transmission antenna 18-2. Further, when the transmission signal S2 of the second highest transmission rate and the transmission signal S3 of the lowest transmission rate are transmitted from the transmission antennas 18-1 and 18-3, respectively, the preamble signal "Preamble 2" of the second highest priority and the preamble signal "Preamble 3" of the lowest priority are added to the signals transmitted from the transmission antennas 18-1 and 18-3, respectively.

As described above, where a preamble signal to be added to a transmission signal is changed in accordance with the transmission rate of the signal, it is sufficient if only information indicating the combination of modulation schemes and coding rates used in the wireless transmission device is sent from the wireless transmission device to the wireless receiving device.

A description will be given of a case example where the three transmission units transmit transmission signals of modulation schemes BPSK, QPSK and 16 QAM. In this case, if a conventional scheme is employed in which a fixed preamble signal is added to each transmission unit, it is necessary for each unit to send information indicating that the employed modulation scheme is BPSK, QPSK or 16 QAM. In contrast, in the embodiment, it is sufficient if only information indicating the combination of modulation schemes BPSK, QPSK and 16 QAM used is sent. The modulation scheme of a signal transmitted immediately after the preamble signal used for channel response estimation can be necessarily determined if the combination of modulation schemes, and the order of distribution of the information units, into which the serial-to-parallel converter 11 divides the information sequence 10, are detected.

In FIGS. 5 and 6, a header signal "Head" is transmitted immediately after the preamble signal, and then a data signal "Data" is transmitted. As shown in FIG. 8, the header signal "Head" contains information necessary for demodulation, such as the number of transmission antennas (i.e., the number of transmission units), the combination of transmission rates employed for signals transmitted from the transmission units, and the data length of each transmitted signal. Specifically, the combination of transmission rates is, for example, the combination of modulation schemes BPSK, QPSK and 16 QAM. In the cases of FIGS. 5 and 6, the header signal "Head" is transmitted from all transmission antennas. However, this signal may be transmitted from only a particular one of the transmission antennas, as shown in FIG. 7.

Figure 9:
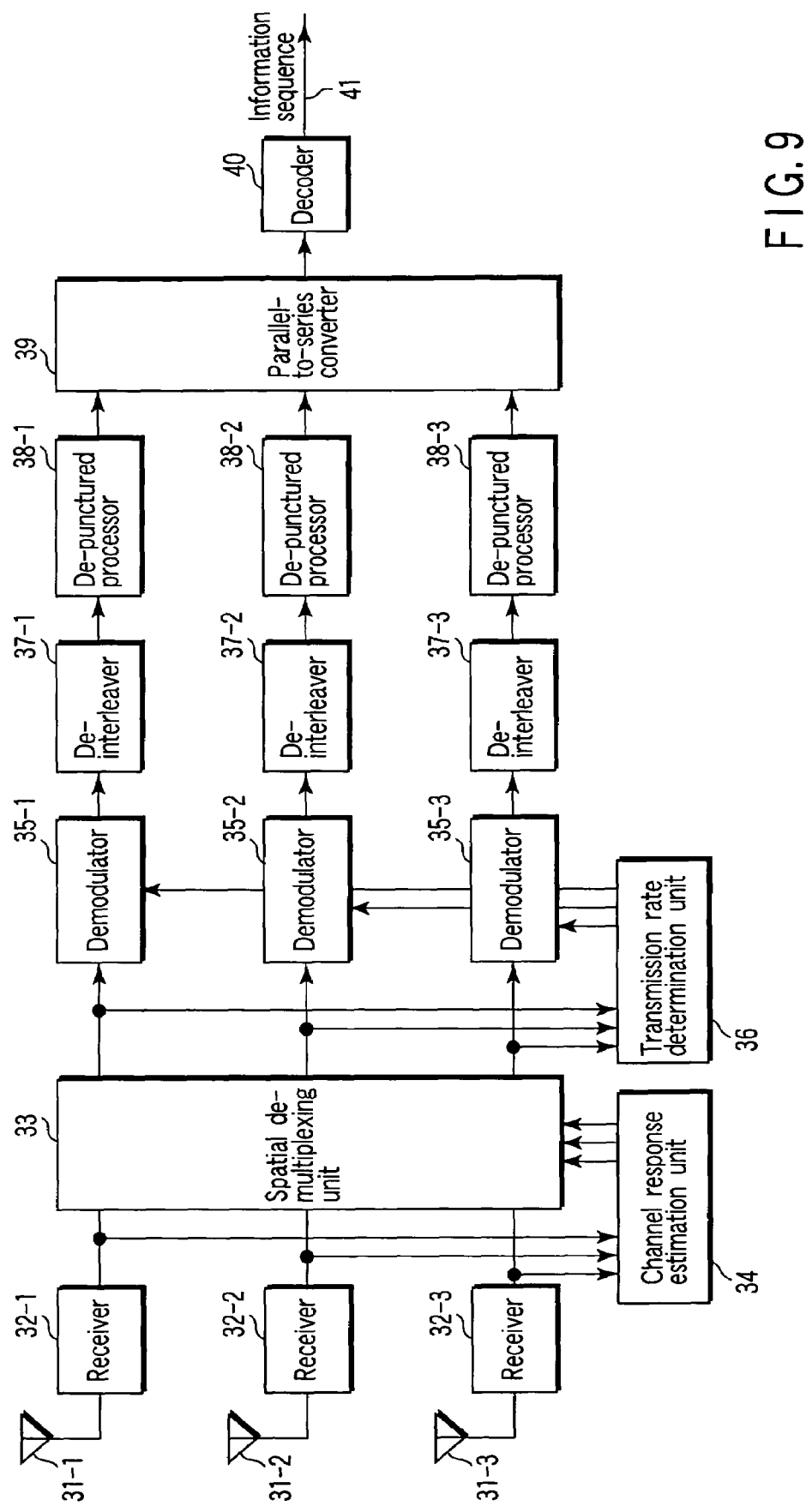
FIG. 9 is a block diagram illustrating a wireless receiving device according to the embodiment of the invention.

Referring now to FIG. 9, the wireless receiving device of the embodiment will be described.

The wireless receiving device comprises a plurality of receiving units (three receiving units in the embodiment) including receiving antennas 31-1 to 31-3 and receivers 32-1 to 32-3, respectively. The signals received by the antennas 31-1 to 31-3 are input to the receivers 32-1 to 32-3, respectively.

As can be seen from FIG. 10 that shows only the receiver 32-1 as a representative, in each of the receivers 32-1 to 32-3, a received signal is amplified by a low noise amplifier 51, and then sent to a frequency converter 52 where it is converted into an IF signal or baseband signal through frequency conversion, i.e., "down" conversion. The IF or baseband signal output from the frequency converter 52 has its undesired component removed by a filter 53. The resultant signal is converted into a digital signal by an A/D converter 54.

The signal output from each of the receivers 32-1 to 32-3 is input to a spatial de-multiplexing unit 33 and channel response estimation unit 34. The channel response estimation unit 34 estimates the response of each channel or channel formed between the receiving units of the wireless receiving device and the transmission units of the wireless transmission device, using a preamble signal in each digitized received signal. For estimation of channel responses, various methods can be utilized, depending upon the types of preamble signals used in the wireless transmission device. For instance, a method based on the least square method or on the minimum mean square error method could be utilized.

The spatial de-multiplexing unit 33 will be described. Since the outputs of the receivers 32-1 to 32-3 are signals subjected to multiplexing in space between the wireless transmission and receiving devices and hence interfering with each other, they cannot be demodulated. The spatial de-multiplexing unit 33 separates, from the interfering signals, the signals transmitted from the transmission units, using the channel responses estimated by the channel response estimation unit 34. To separate the transmission signals, a method for separating each signal based on the least square method, a method for multiplying matrices calculated based on the minimum mean square error method, or a method for separating the signals using a successive interference canceller can be utilized.

Each signal separated by the spatial de-multiplexing unit 33 has included the preamble signal "Preamble 1", "Preamble 2" or "Preamble 3", the signals added "Preamble 1", "Preamble 2" and "Preamble 3" are input to demodulators 35-1, 35-2 and 35-3, respectively. The demodulators 35-1, 35-2 and 35-3 perform demodulation, using demodulation schemes corresponding to the modulation schemes indicated by the transmission rates that are determined by a transmission rate determination unit 36.

The signals output from the demodulators 35-1 to 35-3 are input to de-interleavers 37-1 to 37-3, respectively, where they are subjected to a de-interleave process that is reverse to the process performed by the interleavers 14-1 to 14-3 in the wireless transmission device. The resultant signals are sent to de-punctured processors 38-1 to 38-3, where they are subjected to a de-punctured process that is reverse to the process performed by the punctured processors 13-1 to 13-3 in the wireless transmission device. After that, the signals are input to a parallel-to-series converter 39, where they are subjected to parallel-to-series conversion that is reverse to the process performed by the serial-to-parallel converter 11 in the wireless transmission device. As a result, the demodulated signals are converted into a single signal sequence. The output of the parallel-to-series converter 39 is input to a decoder 40, where it is subjected to a decoding process that is reverse to the encoding process performed by the encoders 12-1 to 12-3 in the wireless transmission device. As a result, an information sequence 41 corresponding to the original information sequence 10 is generated.

The transmission rate determination unit 36 will be described. In the embodiment, the information transmitted by the head signal "Head" shown in FIG. 8 only indicates the combination of transmission rates employed for signals transmitted from the transmission units of the wireless transmission device. The transmission rates themselves are not transmitted. Therefore, when the demodulators 35-1 to 35-3 perform demodulation, it is necessary to determine the modulation scheme used by each of the modulators 15-1 to 15-3 of the wireless transmission device.

The following description will be given, assuming that it has been read from the header signal "Head" that the modulators 15-1 to 15-3 utilize the modulation schemes BPSK, QPSK and 16 QAM, respectively. The header signal "Head" contains information indicating the combination of transmission rates employed for signals transmitted from the transmission units. From this information, the combination of modulation schemes can be detected.

If the wireless receiving device has information indicating that the preamble signals "Preamble 1", "Preamble 2" and "Preamble 3" are added to the respective transmission signals arranged in the descending order of transmission rate, the transmission rate determination unit 36 can uniquely determine that the modulators 15-1, 15-2 and 15-3 utilize 16QAM, QPSK and BPSK for modulation, respectively. As a result, the demodulators 35-1 to 35-3 can perform demodulation corresponding to the respective modulation schemes. If the preamble signals "Preamble 1", "Preamble 2" and "Preamble 3" are added to the respective transmission signals arranged in the ascending order of transmission rate, the transmission rate determination unit 36 can uniquely determine that the modulators 15-1, 15-2 and 15-3 utilize BPSK, QPSK and 16 QAM for modulation, respectively. Thus, regardless of whether the order of assignment of the preamble signals "Preamble 1", "Preamble 2" and "Preamble 3" corresponds to the ascending order of transmission rate or to the descending order of transmission rate, the respective modulation schemes of the modulators 15-1, 15-2 and 15-3 can be determined uniquely if the wireless receiving device has information concerning the order of transmission rate.

In the above, a description has been given of the operation of the transmission rate determination unit 36 performed when the modulators 15-1 to 15-3 of the wireless transmission device employ, for example, the modulation schemes BPSK, QPSK and 16 QAM for modulation. However, as mentioned above, various combinations of modulation schemes other than the above modulation schemes can be utilized, therefore, it is sufficient if the determination method used by the transmission rate determination unit 36 is changed in accordance with the combination employed.

In the wireless transmission device described above, the transmission-signal-generating unit sets the transmission rates mainly by changing the modulation schemes. However, since the transmission rates are determined from each combination of the modulation schemes and the coding rates, the transmission rates may be set by changing both the modulation schemes and the coding rates. Further, if the situation requests, the transmission rates may be set by changing only the coding rates. In this case, the transmission rate determination unit 36 can uniquely determine the coding rate of a signal transmitted from any wireless transmission device, based on the combination of transmission rates detected from the header signal "Head" included in the transmission signal, and the preamble signal included in the transmission signal. The de-punctured processors 38-1 to 38-3 de-puncture each signal based on the determined coding rate.

The wireless transmission device shown in FIG. 1 only sends, as a header signal, information indicating the combination of transmission rates employed for signals transmitted from the transmission units, and does not send information indicating the transmission rates themselves. The wireless receiving device of the embodiment can acquire, from the combination of transmission rates and the preamble signal, the transmission rate employed for a signal transmitted from each transmission unit, and can perform correct demodulation based on the transmission rate.

Figure 11:
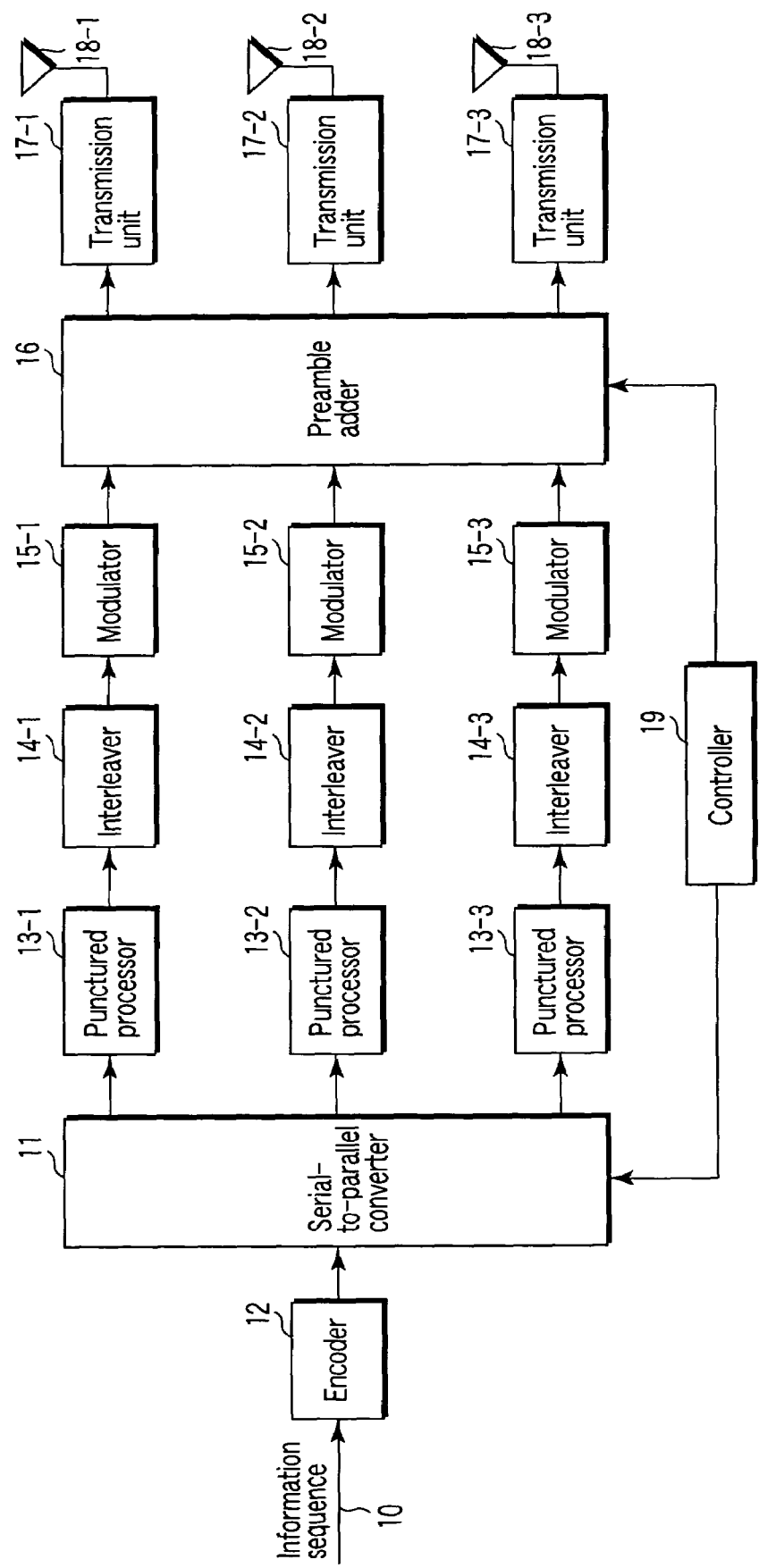
FIG. 11 is a block diagram illustrating a wireless transmission device according to another embodiment of the invention.

Referring then to FIGS. 11 to 13, a description will be given of modifications of the wireless transmission device of FIG. 1. In these modifications, the transmission-signal-generating unit differs from that shown in FIG. 1 in the position of the serial-to-parallel converter 11.

For example, in the modification shown in FIG. 11, the to-be-transmitted information sequence 10 is directly input to the encoder 12, and coded data from the encoder 12 is input to the serial-to-parallel converter 11. Specifically, the information sequence 10 is encoded by the encoder 12, and the resultant coded data is divided by the serial-to-parallel converter 11 into a plurality of coded data units corresponding to the information units of the information sequence 10 in the above-described embodiment. Each coded data unit output from the serial-to-parallel converter 11 is input to the punctured processors 13-1 to 13-3, thereby generating coded data units having a first coding rate (=the coding rate of the encoder 12) changed to a second coding rate.

In the modification of FIG. 12, the punctured processor 13 and interleaver 14 are interposed between the encoder 12 and the serial-to-parallel converter 11, while in the modification of FIG. 13, only the punctured processor 13 is interposed between the encoder 12 and the serial-to-parallel converter 11.

Thus, in the embodiment of FIG. 1, an encoder, punctured processor and interleave are provided in units of channels employed in the transmission-signal-generating unit. In contrast, in the modification of FIG. 11, a common encoder is used between the channels. In FIG. 12, a common encoder, punctured processor and interleaver are used between the channels. In FIG. 13, a common encoder and punctured processor are used between the channels. If the situation requests, any or all of the encoder, punctured processor and inter-leaver may be omitted. Namely, it is sufficient if the transmission-signal-generating unit can generate a plurality of transmission signals arranged in the order of transmission rate, and distribute them to the transmission units. These modifications can provide the same advantage as the embodiment of FIG. 1.

On the other hand, the wireless receiving device of FIG. 9 can be modified in various ways in accordance with the modifications of the wireless transmission device shown in FIGS. 11 to 13. For instance, the de-interleavers and de-punctured processors may be provided after the parallel-to-series converter 39. Further, the de-interleavers and/or the de-punctured processors may be omitted.

To enhance the throughput, representative embodiments effectively reduces the amount of information concerning transmission rates to be sent to the receiving device, without reducing the number of combinations of transmission rates that can be used by the transmission device when the transmission units of the transmission device simultaneously transmit signals of different transmission rates utilizing spatial multiplexing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless transmission device which communicates with a wireless reception device, comprising:
   a transmission-signal-generating unit configured to generate a plurality of transmission signals, respective transmission rates thereof being different transmission rates that are determined in accordance with combinations of coding rates and modulation schemes;
   a controller configured to assign a plurality of different preamble signals to the plurality of transmission signals, respectively, according to ranks of the plurality of transmission signals arranged in order corresponding to the different transmission rates, the different preamble signals corresponding to the ranks, respectively, and being used for an estimation of channel responses at the wireless reception device;

a preamble adder which adds, to each transmission signal of the plurality of transmission signals, one of the different preamble signals that corresponds to a rank of the transmission signal; and a plurality of transmission units configured to transmit the plurality of transmission signals with the preamble signals added thereto, the plurality of transmission units including respective transmission antennas.

2. The wireless transmission device according to claim 1, wherein the transmission-signal-generating unit generates the plurality of transmission signals using modulation and coding schemes (MCS) for determining the transmission rates.

3. The wireless transmission device according to claim 1, wherein at least one of the plurality of transmission signals includes information indicating a combination of the transmission rates of the plurality of transmission signals.

4. The wireless transmission device according to claim 1, wherein the transmission-signal-generating unit generates the plurality of transmission signals in accordance with the combinations of coding rates and modulation schemes for determining the transmission rates, and the information sequence includes information indicating the MCS for determining the transmission rates.

5. The wireless transmission device according to claim 1, wherein the transmission-signal-generating unit includes a serial-to-parallel converter which subjects the information sequence to serial-to-parallel conversion to divide the information sequence into information units, a plurality of encoders which encodes the information units into coded data, and a plurality of modulators which modulate the coded data into the transmission signals.

6. The wireless transmission device according to claim 1, wherein the transmission-signal-generating unit includes a serial-to-parallel converter which subjects the information sequence to serial-to-parallel conversion to divide the information sequence into information units, a plurality of encoders which encode the information units into first coded data of a first coding rate, a plurality of punctured processors which performs a punctured process to change the first coded data of the first coding rate into second coded data of a second coding rate, and a plurality of modulators which modulate the second coded data into the transmission signals.

7. The wireless transmission device according to claim 1, wherein the transmission-signal-generating unit includes an encoder which encodes the information sequence into coded data, a serial-to-parallel converter which subjects the coded data to serial-to-parallel conversion to generate a plurality of coded data units corresponding to information units of the information sequence, and a plurality of modulators which modulate the coded data units into the transmission signals.

8. The wireless transmission device according to claim 1, wherein the transmission-signal-generating unit includes an encoder which encodes the information sequence into coded data of a first coding rate, a serial-to-parallel converter which subject the coded data to serial-to-parallel conversion to generate a plurality of first coded data units corresponding to information units of the information sequence, a punctured processor which performs a punctured process for changing the first coded data units into second coded data units of a second coding rate, and a plurality of modulators which modulate the second coded data units into the transmission signals.

9. The wireless transmission device according to claim 1, wherein the transmission-signal-generating unit includes an encoder which encodes the information sequence into first coded data of a first coding rate, a punctured processor which performs a punctured process for changing the first coded data into second coded data of a second coding rate, a serial-to-parallel converter which subjects the second coded data to serial-to-parallel conversion to generate a plurality of coded data units corresponding to information units of the information sequence, and a plurality of modulators which modulate the coded data units into the transmission signals.

10. A wireless transmission device for transmitting different information items at a plurality of different transmission rates, comprising:

means for transmitting a combination of information items concerning the plurality of different transmission rates, which are determined in accordance with combinations of coding rates and modulation schemes;

control means for assigning a plurality of different preamble signals to a plurality of transmission signals, respectively, according to ranks of the plurality of transmission signals arranged in order corresponding to the different transmission rates, the different preamble signals corresponding to the ranks, respectively, and being used for an estimation of channel responses at the wireless reception device:

preamble adding means for adding, to each transmission signal of the plurality of transmission signals, one of the preamble signals that corresponds to a rank of the transmission signal; and a plurality of transmission antennas which transmit the plurality of transmission signals with the preamble signals added thereto.

11. The wireless transmission device according to claim 10, wherein information concerning the transmission rates is modulation and coding schemes (MCS) employed for signals transmitted from the transmission antennas.

12. A wireless receiving device, comprising:

a receiving unit including a plurality of receiving antennas and configured to receive a plurality of transmission signals via a plurality of channels, thereby acquiring a plurality of received signals, the plurality of transmission signals having different transmission rates that are determined in accordance with combinations of coding rates and modulation schemes, the plurality of transmission signals being provided with respective different preamble signals used for estimation of channel responses, the different preamble signals being assigned to the plurality of transmission signals according to ranks of the plurality of transmission signals arranged in order corresponding to the different transmission rates, the different preamble signals corresponding to the ranks, respectively;

a channel response estimation unit configured to estimate a plurality of channel responses using the different preamble signals contained in the received signals;

a spatial demultiplexing unit configured to separate, from the received signals, signals corresponding to the transmission signals, using estimation results of the channel response estimation unit; and a reproduction unit configured to reproduce the information sequence using the different preamble signals contained in the signals separated from the received signals.

13. The wireless receiving device according to claim 12, wherein the plurality of transmission signals include information indicating a combination of the transmission rates of the plurality of transmission signals, and the reproduction unit reproduces the information sequence from the separated signals, based on the information indicating the combination of the transmission rates and the different preamble signals.

* * * * *